United States Patent
Park et al.

(10) Patent No.: US 9,581,227 B2
(45) Date of Patent: Feb. 28, 2017

(54) TRANSMISSION FOR VEHICLE

(71) Applicant: Hyundai Motor Company, Seoul (KR)

(72) Inventors: Jong Yun Park, Hwaseong-si (KR); Kyung Ha Kim, Yongin-si (KR); Ki Nam Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 349 days.

(21) Appl. No.: 14/285,041

(22) Filed: May 22, 2014

(65) Prior Publication Data

US 2015/0167787 A1    Jun. 18, 2015

(30) Foreign Application Priority Data

Dec. 13, 2013  (KR) .................. 10-2013-0155491

(51) Int. Cl.
*F16H 3/093*    (2006.01)
*F16H 37/04*    (2006.01)
*F16H 3/00*     (2006.01)

(52) U.S. Cl.
CPC .......... *F16H 37/046* (2013.01); *F16H 3/006* (2013.01); *F16H 2003/0931* (2013.01); *Y10T 74/19228* (2015.01)

(58) Field of Classification Search
CPC ...................................... F16H 3/093
See application file for complete search history.

(56) References Cited

U.S. PATENT DOCUMENTS

| | | | | |
|---|---|---|---|---|
| 3,589,483 A * | 6/1971 | Smith | ...................... | F16H 3/097 192/3.52 |
| 4,790,418 A * | 12/1988 | Brown | .................. | F16H 61/061 192/103 F |
| 6,969,335 B2 * | 11/2005 | Lorken | ................... | F16H 3/006 475/302 |
| 7,086,989 B2 * | 8/2006 | Siebigteroth | ......... | F16H 61/061 477/109 |
| 8,313,406 B2 * | 11/2012 | Braford, Jr. | ............. | F16H 3/006 475/218 |
| 8,323,142 B2 * | 12/2012 | Masumoto | .............. | F16H 3/006 475/218 |

FOREIGN PATENT DOCUMENTS

| | | |
|---|---|---|
| JP | 2005-163927 A | 6/2005 |
| JP | 2008-57655 A | 3/2008 |
| JP | 2010-144775 A | 7/2010 |
| JP | 2010-196745 A | 9/2010 |
| JP | 2013-204676 A | 10/2013 |
| KR | 10-2008-0058388 A | 6/2008 |

\* cited by examiner

*Primary Examiner* — Tisha Lewis
(74) *Attorney, Agent, or Firm* — Morgan, Lewis & Bockius LLP

(57) ABSTRACT

A transmission for a vehicle may include a first input shaft to which power may be selectively transmitted by a first clutch, a second input shaft to which power may be selectively transmitted by a second clutch, wherein the second input shaft concentrically surrounds the first input shaft, first and second output shafts disposed in parallel with the first and second input shafts, a multiplicity of shifting gears disposed in the first and second output shafts so as to be meshed with gears of the first and second input shafts to respectively form gear steps, a plurality of synchronizing devices configured to selectively couple or decouple the shifting gears to or from the first or second output shafts, and a planetary gear train configured to selectively switch a revolution direction of one of the shifting gears.

5 Claims, 2 Drawing Sheets

TRANSMISSION FOR VEHICLE

CROSS REFERENCE TO RELATED APPLICATION

The present application claims a priority of Korean Patent Application Number No. 10-2013-0155491 filed on Dec. 13, 2013, the entire contents of which is incorporated herein for all purposes by this reference.

BACKGROUND OF THE INVENTION

Field of the Invention

The present invention relates, in general, to a transmission for a vehicle and, more particularly, to a structure of a transmission for a vehicle in which a plurality of gear steps is formed while the number of shafts used is minimized.

Description of Related Art

Generally, when manufactured with fewer parts and in a light, compact structure, a transmission for a vehicle has low manufacturing cost, improved fuel efficiency, and easy assembly in a vehicle.

Particularly when the number of shafts configured in a transmission is minimized, advantageously, the volume and weight of the transmission are considerably reduced.

In addition, in a case where a transmission can realize as many gear steps as possible while being manufactured with fewer parts and in a light, compact structure, efficient operation of an engine and improved fuel efficiency are possible.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle which is able to realize a reverse gear step and multiple forward gear steps while minimizing the number of shafts used, thereby contributing to low manufacturing cost, improved assembly in a vehicle, and excellent fuel efficiency.

In an aspect of the present invention, a transmission for a vehicle may include a first input shaft to which power is selectively transmitted by a first clutch, a second input shaft to which power is selectively transmitted by a second clutch, wherein the second input shaft concentrically surrounds the first input shaft, first and second output shafts disposed in parallel with the first and second input shafts, a multiplicity of shifting gears disposed in the first and second output shafts so as to be meshed with gears of the first and second input shafts to respectively form gear steps, a plurality of synchronizing devices configured to selectively couple or decouple the shifting gears to or from the first or second output shafts, and a planetary gear train configured to selectively switch a revolution direction of one of the shifting gears.

The planetary gear train may include a sun gear directly coupled to the first or second output shaft, a carrier selectively fixed, and a ring gear directly coupled to a shifting gear which is rotatably mounted on a shaft to which the sun gear is directly coupled.

The carrier is configured to be switchable between fixation to and release from a transmission casing by a dog clutch Around the first output shaft, first-step to fourth-step shifting gears are arranged such that the first-step and third-step shifting gears adjoin each other and are meshed with first and third gears of the first input shaft, and the second-step and fourth-step shifting gears adjoin each other and are meshed with fourth and fifth gears of the second input shaft.

Around the second output shaft, fifth-step and sixth-step shifting gears and 5 & 6-step synchronizing device are arranged such that the fifth-step and sixth-step shifting gears adjoin each other and are meshed with second and fifth gears of the first and second input shafts, respectively, and 5 & 6-step synchronizing device is arranged so as to couple or decouple any one of the fifth-step and sixth-step shifting gears to or from the second output shaft.

The planetary gear train is configured such that the sun gear is directly connected with the second output shaft, the ring gear is connected with the sixth-step shifting gear, and the carrier is selectively fixed to a transmission casing by a dog clutch.

According to the present invention, a reverse gear step and a multiplicity of forward gear steps are realized while the number of shafts in a transmission is minimized, thereby contributing to low manufacturing cost, improved assembly in a vehicle, and excellent fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
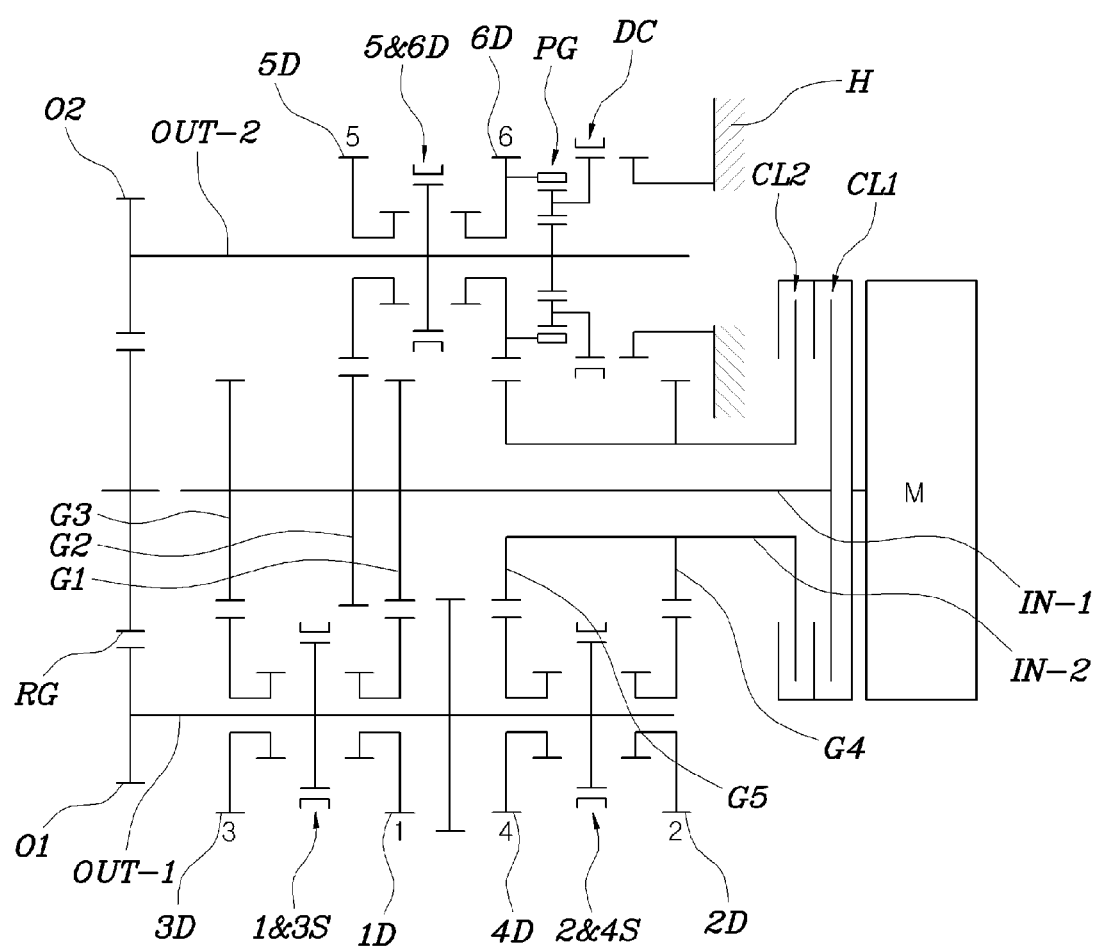
FIG. 1 is a view showing the construction of a transmission for a vehicle according to embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

Referring to FIG. 1, a transmission for a vehicle according to an exemplary embodiment of the present invention includes: a first input shaft IN-1 to which power is transmitted by a first clutch CL1, a second input shaft IN-2 to which power is transmitted by a second clutch CL2, wherein the second input shaft concentrically surrounds the first input shaft IN-1, first and second output shafts OUT-1 and OUT-2 disposed parallel to the first and second input shafts IN-1 and IN-2, a multiplicity of shifting gears disposed in the first and second output shafts OUT-1 and OUT-2 so as to be meshed with those of the first and second input shafts IN-1 and IN-2 to respectively form gear steps, a plurality of synchronizing devices configured to selectively couple or decouple the shifting gears to or from the first or second output shafts OUT-1 or OUT-2, and a planetary gear train PG configured to selectively switch a revolution direction of one of shifting gears.

That is to say, unlikely other transmissions, the transmission according to the exemplary embodiment does not include a separate reverse idler shaft, but provides the planetary gear train PG, in order to realize an R gear step that is a reverse gear step. Thus, the feature of having no separate shaft enables the transmission to have reduced volume and weight, while relatively numerous available gear steps are realized, contributing to improved fuel efficiency.

The first and second clutches CL1 and CL2 are connected with a motor M, and this construction can configure an electric vehicle as it stands. In addition, if an engine clutch and an engine are separately coupled in the order to the motor M, a hybrid vehicle can be configured.

The planetary gear train PG may be configured so that a sun gear is directly coupled to the first or second output shaft OUT-1 or OUT-2, a carrier is selectively fixedly mounted, and a ring gear is directly coupled to a shifting gear which is mounted on the shaft to which the sun gear is directly coupled.

In the present embodiment, the carrier is configured to be switchable between a fixed and released state with respect to a transmission casing H by means of a dog clutch DC, which, however, may be replaced by other synchronizing devices, a separate brake or the like.

Around the first output shaft OUT-1, first-step to fourth-step shifting gears 1D, 2D, 3D, and 4D are arranged such that the first-step and third-step shifting gears 1D and 3D adjoin each other and are meshed with first and third gears G1 and G3 of the first input shaft IN-1, and the second-step and fourth-step shifting gears 2D and 4D adjoin each other and are meshed with fourth and fifth gears G4 and G5 of the second input shaft IN-2.

Further, around the first output shaft OUT-1, the 1 & 3-step synchronizing device 1 & 3S is arranged so as to couple or decouple any one of the first-step and third-step shifting gears 1D and 3D to or from the first output shaft OUT-1, and the 2 & 4-step synchronizing device 2 & 4S is arranged so as to couple or decouple any one of the second-step and fourth-step shifting gears 2D and 4D to or from the first output shaft OUT-1.

Around the second output shaft OUT-2, the fifth-step and sixth-step shifting gears 5D and 6D, and the 5 & 6-step synchronizing device 5 & 6S are arranged such that the fifth-step and sixth-step shifting gears 5D and 6D adjoin each other and are meshed with second and fifth gears G2 and G5 of the first and second input shafts IN-1 and IN-2, respectively, and the 5 & 6-step synchronizing device 5 & 6S is arranged so as to couple or decouple any one of the fifth-step and sixth-step shifting gears 5D and 6D to or from the second output shaft OUT-2.

In the exemplary embodiment shown in FIG. 1, the planetary gear train PG is configured such that the sun gear is directly connected with the second output shaft OUT-2, the ring gear is connected with the sixth-step shifting gear 6D, and the carrier is fixedly mounted to the transmission casing by means of the dog clutch DC.

In the meantime, the first and second output shafts OUT-1 and OUT-2 are respectively provided with first and second output gears O1 and O2, which respectively output power to a ring gear RG of a differential gear.

In the transmission, when the first and second clutches CL1 and CL2 are engaged so that power is transmitted to the first or second output shaft OUT-1 or OUT-2, any one of synchronizing devices connect a shifting gear and an output shaft that are matched each other, so that speed-changed power is transmitted to the differential gear.

The operation of an R gear step that is a reverse gear step will now be described with reference to FIG. 2.

Figure 2:
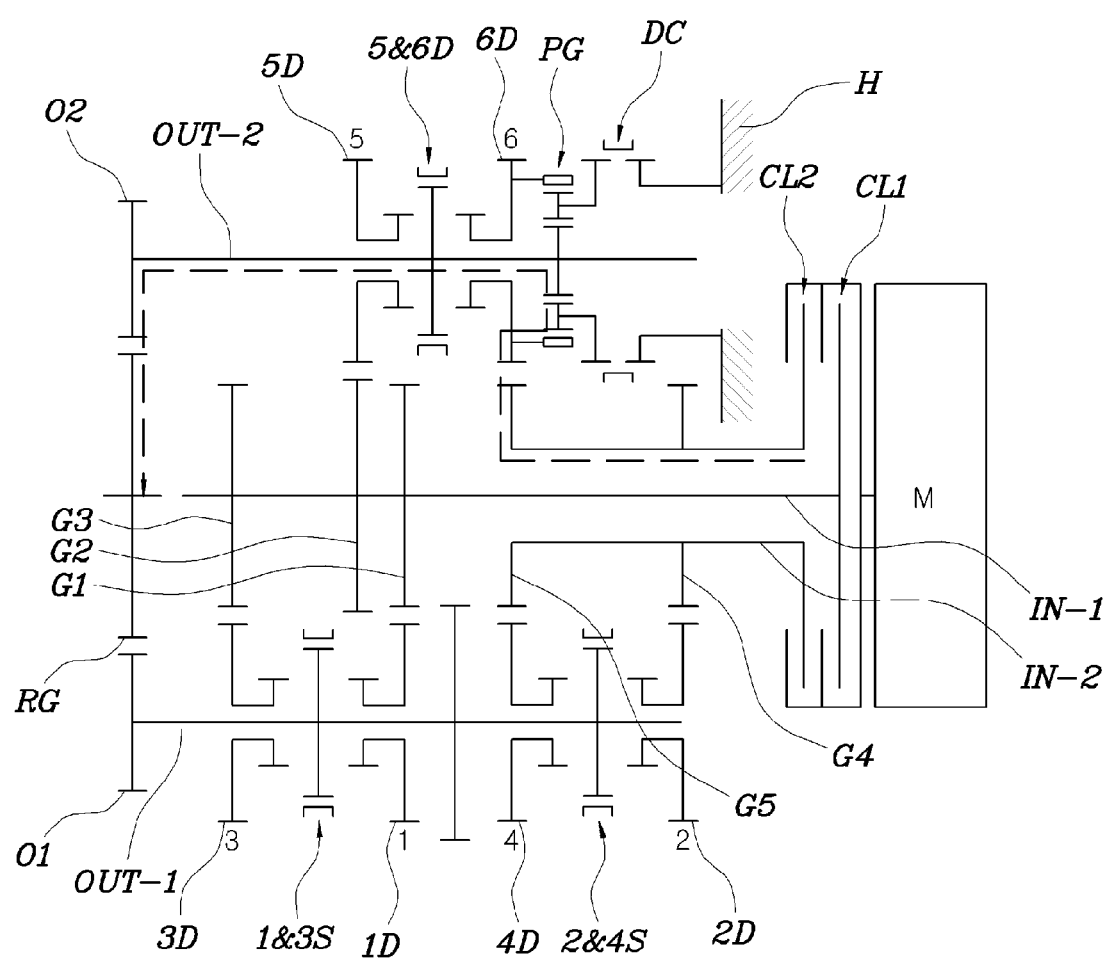
FIG. 2 is a view showing a reverse gear step of the transmission.

In order to realize the R gear step, as shown in FIG. 2, the dog clutch DG is engaged so that the carrier is fixed to the transmission casing or the like, and then the second clutch CL2 is engaged so as to transmit power.

That is, when the second clutch CL2 transmits power from a power source such as a motor M, an engine or the like to the second input shaft IN-2, the sixth-step shifting gear 6D, which is meshed with the gear of the second input shaft IN-2, rotates. Here, the rotating force of the sixth-step shifting gear 6D is input to the planetary gear train PG via the ring gear RG, and then is reversely output via the sun gear. Then, the power drives the ring gear of the differential gear via the second output gear O2, so that output power from the reverse gear step is transmitted to driving wheels.

In order to realize a sixth gear step, in a state where the dog clutch DC is disengaged and the sixth-step shifting gear 6D is coupled to the second output shaft OUT-2 by the 5 & 6-step synchronizing device 5 & 6S, the second clutch CL2 is engaged so as to transmit power, so that the sixth gear step is formed by a gear ratio of the gear of the second input shaft IN-2 and the sixth-step shifting gear 6D, thereby the power being transmitted to the second output gear O2.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle comprising:
a first input shaft to which power is selectively transmitted by a first clutch;
a second input shaft to which power is selectively transmitted by a second clutch, wherein the second input shaft concentrically surrounds the first input shaft;
first and second output shafts disposed in parallel with the first and second input shafts;
a multiplicity of shifting gears disposed in the first and second output shafts so as to be meshed with gears of the first and second input shafts to respectively form gear steps;
a plurality of synchronizing devices configured to selectively couple or decouple the shifting gears to or from the first or second output shafts; and
a planetary gear train configured to selectively switch a revolution direction of one of the shifting gears,
wherein the planetary gear train includes:
a sun gear directly coupled to the first or second output shaft;
a carrier selectively fixed; and
a ring gear directly coupled to a shifting gear which is rotatably mounted on a shaft to which the sun gear is directly coupled.

2. The transmission for the vehicle according to claim 1, wherein the carrier is configured to be switchable between fixation to and release from a transmission casing by a dog clutch.

3. The transmission for the vehicle according to claim 1, wherein around the first output shaft, first-step to fourth-step shifting gears are arranged such that the first-step and third-step shifting gears adjoin each other and are meshed with first and third gears of the first input shaft, and the second-step and fourth-step shifting gears adjoin each other and are meshed with fourth and fifth gears of the second input shaft.

4. The transmission for the vehicle according to claim 3, wherein around the second output shaft, fifth-step and sixth-step shifting gears and 5 & 6-step synchronizing device are arranged such that the fifth-step and sixth-step shifting gears adjoin each other and are meshed with second and fifth gears of the first and second input shafts, respectively, and 5 & 6-step synchronizing device is arranged so as to couple or decouple any one of the fifth-step and sixth-step shifting gears to or from the second output shaft.

5. The transmission for the vehicle according to claim 4, wherein the planetary gear train is configured such that the sun gear is directly connected with the second output shaft, the ring gear is connected with the sixth-step shifting gear, and the carrier is selectively fixed to a transmission casing by a dog clutch.

* * * * *